United States Patent
Todd et al.

(10) Patent No.: US 12,481,978 B2
(45) Date of Patent: Nov. 25, 2025

(54) THIRD-PARTY PROXIES FOR CRYPTO-BASED DCF

(71) Applicant: Dell Products L.P., Round Rock, TX (US)

(72) Inventors: Stephen J. Todd, North Andover, MA (US); Trevor Scott Conn, Leander, TX (US); Ahmed Khalid, Cork (IE); Mustafa Al-Bado, Cork (IE)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 18/362,771

(22) Filed: Jul. 31, 2023

(65) Prior Publication Data

US 2025/0045731 A1    Feb. 6, 2025

(51) Int. Cl.
*G06Q 20/36* (2012.01)
*G06Q 20/38* (2012.01)

(52) U.S. Cl.
CPC ......... *G06Q 20/367* (2013.01); *G06Q 20/389* (2013.01)

(58) Field of Classification Search
None
See application file for complete search history.

(56) References Cited

U.S. PATENT DOCUMENTS

| | | | |
|---|---|---|---|
| 7,302,641 B1 | 11/2007 | Yajima | |
| 9,330,389 B2 * | 5/2016 | Pitroda | G06Q 30/06 |
| 10,135,607 B1 | 11/2018 | Roets | |

(Continued)

FOREIGN PATENT DOCUMENTS

| | | | | |
|---|---|---|---|---|
| WO | WO-2018126077 A1 * | 7/2018 | ......... | G06F 16/1824 |
| WO | WO-2019210409 A1 * | 11/2019 | ............. | G06F 16/27 |

(Continued)

OTHER PUBLICATIONS

Choudhury et al. "Impact of Distributed Ledger Technology in Global Capital Markets." (May 16, 2023) Retrieved online Apr. 2, 2025. https://www.gfma.org/wp-content/uploads/2023/05/impact-of-dlt-on-global-capital-markets-full-report.pdf. (Year: 2023).*

(Continued)

*Primary Examiner* — James A Reagan
(74) *Attorney, Agent, or Firm* — Workman Nydegger

(57) ABSTRACT

One example method includes receiving, by a trust provider from a third party proxy, an indication that the third party proxy has instantiated a smart contract on behalf of the trust provider, connecting wallets of a customer to an agent of a data confidence fabric, in response to a request from an application, providing a trust service that includes processing customer data by applying a trust function to the customer data, creating annotations for the customer data based on the trust function, providing the processed customer data to a recipient, calling the smart contract using successive ones of the customer wallets until the smart contract is successfully executed, transferring, from the customer wallet that resulted in successful execution of the smart contract to the third party proxy, a trust provider fee, and transferring the trust provider fee from a third party proxy wallet to a trust provider wallet.

20 Claims, 3 Drawing Sheets

(56) References Cited

U.S. PATENT DOCUMENTS

| | | | |
|---|---|---|---|
| 10,438,290 B1* | 10/2019 | Winklevoss | G06F 16/1815 |
| 10,581,805 B2* | 3/2020 | Simons | G06N 20/00 |
| 10,601,665 B2* | 3/2020 | Bathen | G06F 16/27 |
| 10,871,948 B1 | 12/2020 | Dowling | |
| 10,915,891 B1* | 2/2021 | Winklevoss | H04L 9/3255 |
| 11,108,891 B1 | 8/2021 | Todd et al. | |
| 11,153,280 B1 | 10/2021 | Walwadkar | |
| 11,188,977 B2* | 11/2021 | Youb | G06F 21/64 |
| 11,200,569 B1* | 12/2021 | James | G06Q 20/381 |
| 11,308,487 B1* | 4/2022 | Foster | G06Q 20/3829 |
| 11,334,883 B1* | 5/2022 | Auerbach | G06Q 20/223 |
| 11,416,230 B2 | 8/2022 | Todd et al. | |
| 11,533,381 B1 | 12/2022 | Hockey | |
| 11,562,333 B1 | 1/2023 | James et al. | |
| 11,716,312 B1* | 8/2023 | McNamara, Jr. | G06F 21/46 726/6 |
| 11,792,084 B1 | 10/2023 | Foukas et al. | |
| 11,961,070 B2* | 4/2024 | Sarin | G06Q 20/3674 |
| 11,971,862 B1 | 4/2024 | Han et al. | |
| 11,978,044 B2* | 5/2024 | Basu | H04L 9/3247 |
| 12,008,561 B2* | 6/2024 | Cona | H04W 12/75 |
| 12,032,696 B2 | 7/2024 | Todd | |
| 12,045,879 B2 | 7/2024 | Rapowitz et al. | |
| 12,118,613 B2* | 10/2024 | Foote | G06Q 20/3829 |
| 12,141,871 B1* | 11/2024 | James | G06Q 20/065 |
| 2009/0024660 A1 | 1/2009 | Borgsmidt et al. | |
| 2009/0028135 A1 | 1/2009 | Mantripragada et al. | |
| 2009/0144313 A1 | 6/2009 | Hodge et al. | |
| 2010/0082771 A1 | 4/2010 | Wood et al. | |
| 2010/0153835 A1 | 6/2010 | Xiong et al. | |
| 2011/0296510 A1 | 12/2011 | Hatlelid et al. | |
| 2015/0379510 A1 | 12/2015 | Smith | |
| 2016/0117668 A1* | 4/2016 | Pitroda | G06Q 20/4014 705/71 |
| 2017/0132620 A1* | 5/2017 | Miller | H04L 9/0637 |
| 2018/0101906 A1* | 4/2018 | Mcdonald | G06Q 20/204 |
| 2018/0218343 A1 | 8/2018 | Kolb et al. | |
| 2018/0276626 A1 | 9/2018 | Laiben | |
| 2018/0287800 A1 | 10/2018 | Chapman et al. | |
| 2018/0329693 A1 | 11/2018 | Eksten et al. | |
| 2019/0019251 A1 | 1/2019 | Phillips, IV | |
| 2019/0116158 A1 | 4/2019 | Patil et al. | |
| 2019/0238316 A1 | 8/2019 | Padmanabhan | |
| 2019/0260803 A1 | 8/2019 | Bykampadi et al. | |
| 2019/0303942 A1 | 10/2019 | Balaraman et al. | |
| 2019/0333054 A1* | 10/2019 | Cona | H04L 9/3297 |
| 2019/0347406 A1 | 11/2019 | Lev-Ran | |
| 2019/0379642 A1* | 12/2019 | Simons | H04L 63/0281 |
| 2019/0385153 A1 | 12/2019 | Cui et al. | |
| 2019/0385154 A1 | 12/2019 | Cui et al. | |
| 2019/0386969 A1* | 12/2019 | Verzun | G06F 21/606 |
| 2020/0007312 A1 | 1/2020 | Vouk et al. | |
| 2020/0027089 A1 | 1/2020 | Kuchar et al. | |
| 2020/0104819 A1 | 4/2020 | Garcia | |
| 2020/0112443 A1 | 4/2020 | Todd | |
| 2020/0120023 A1* | 4/2020 | Munson | G06F 21/602 |
| 2020/0133955 A1 | 4/2020 | Padmanabhan et al. | |
| 2020/0236102 A1 | 7/2020 | Azulay et al. | |
| 2020/0313856 A1* | 10/2020 | Basu | H04L 9/3073 |
| 2020/0344233 A1 | 10/2020 | Lai et al. | |
| 2021/0027404 A1 | 1/2021 | De Bold | |
| 2021/0082044 A1* | 3/2021 | Sliwka | H04L 9/3255 |
| 2021/0112117 A1* | 4/2021 | Munson | H04L 9/3239 |
| 2021/0124727 A1 | 4/2021 | Todd et al. | |
| 2021/0124728 A1 | 4/2021 | Todd et al. | |
| 2021/0126794 A1 | 4/2021 | Forrester et al. | |
| 2021/0164794 A1 | 6/2021 | Nagpal et al. | |
| 2021/0192520 A1 | 6/2021 | Patel et al. | |
| 2021/0209684 A1 | 7/2021 | Foote et al. | |
| 2021/0243167 A1 | 8/2021 | Todd et al. | |
| 2021/0243218 A1 | 8/2021 | Todd et al. | |
| 2021/0304065 A1 | 9/2021 | Todd et al. | |
| 2021/0328886 A1 | 10/2021 | Guim et al. | |
| 2021/0342803 A1 | 11/2021 | Yoo | |
| 2021/0365445 A1 | 11/2021 | Robell et al. | |
| 2021/0366586 A1 | 11/2021 | Ryan et al. | |
| 2021/0374730 A1* | 12/2021 | Todd | G06Q 20/12 |
| 2021/0385216 A1 | 12/2021 | Khalil et al. | |
| 2021/0405983 A1* | 12/2021 | Todd | G06F 21/64 |
| 2021/0409436 A1 | 12/2021 | Todd et al. | |
| 2022/0021711 A1 | 1/2022 | Marsh et al. | |
| 2022/0038289 A1 | 2/2022 | Huang | |
| 2022/0084015 A1 | 3/2022 | Fawzy et al. | |
| 2022/0100858 A1 | 3/2022 | Todd | |
| 2022/0100879 A1 | 3/2022 | Todd et al. | |
| 2022/0116445 A1 | 4/2022 | Filippou et al. | |
| 2022/0129555 A1 | 4/2022 | Todd | |
| 2022/0138325 A1* | 5/2022 | Todd | G06F 21/54 726/26 |
| 2022/0188800 A1* | 6/2022 | Sells | G06Q 20/0658 |
| 2022/0210061 A1* | 6/2022 | Simu | H04L 9/3239 |
| 2022/0253842 A1* | 8/2022 | James | H04L 9/50 |
| 2022/0261882 A1* | 8/2022 | Youb | G06Q 50/16 |
| 2022/0272127 A1 | 8/2022 | Yawalkar et al. | |
| 2022/0294690 A1 | 9/2022 | Nolan et al. | |
| 2022/0327529 A1* | 10/2022 | Williams | H04L 9/50 |
| 2022/0351232 A1 | 11/2022 | Chan et al. | |
| 2023/0114684 A1 | 4/2023 | Jakobsson et al. | |
| 2023/0155984 A1 | 5/2023 | Adam et al. | |
| 2023/0173395 A1* | 6/2023 | Cella | G06Q 30/06 463/25 |
| 2023/0196318 A1* | 6/2023 | Rosen | G06Q 20/3829 705/71 |
| 2023/0230091 A1* | 7/2023 | Vaughn | G06Q 20/4016 705/71 |
| 2023/0237403 A1* | 7/2023 | Reineke | G06Q 10/06393 706/46 |
| 2023/0237499 A1* | 7/2023 | Padmanabhan | G06F 16/27 705/304 |
| 2023/0334492 A1* | 10/2023 | Tai | G06Q 20/3276 |
| 2023/0351393 A1 | 11/2023 | Cella et al. | |
| 2023/0362015 A1 | 11/2023 | Kayaba et al. | |
| 2024/0046318 A1* | 2/2024 | Muriqi | G06Q 20/389 |
| 2024/0106839 A1 | 3/2024 | Smith et al. | |
| 2024/0152889 A1* | 5/2024 | Todd | G06Q 20/4016 |
| 2024/0152911 A1* | 5/2024 | Rezaiean-Asel | G06Q 20/02 |
| 2024/0249277 A1 | 7/2024 | Hwang | |
| 2024/0256691 A1 | 8/2024 | Hwang | |
| 2024/0281799 A1* | 8/2024 | Ryan | G06Q 20/3678 |
| 2024/0289776 A1* | 8/2024 | Bimolaksono | G06Q 20/381 |
| 2024/0354735 A1* | 10/2024 | Kell | G06Q 20/385 |
| 2024/0354747 A1* | 10/2024 | Belostock | G06Q 20/065 |
| 2024/0364521 A1 | 10/2024 | Tang | |
| 2025/0045809 A1* | 2/2025 | Todd | G06Q 30/0609 |
| 2025/0088376 A1 | 3/2025 | Ren et al. | |

FOREIGN PATENT DOCUMENTS

| | | | | |
|---|---|---|---|---|
| WO | WO-2020124317 A1 * | 6/2020 | | G06F 16/27 |
| WO | 2021/173716 A1 | 9/2021 | | |

OTHER PUBLICATIONS

Ahmed G. Gad et al. "Emerging Trends in Blockchain Technology and Applications: A Reveiw and Outlook." (Oct. 2022). Retrieved online Apr. 2, 2025. https://www.sciencedirect.com/science/article/pii/S1319157822000891 (Year: 2002).*

John Kolb. "A Language-Based Approach to Smart Contract Engineering." (Dec. 18, 2020). Retrieved online Apr. 2, 2025. https://www.2.eecs.berkeley.edu/Pubs/TechRpts/2020/EECS-2020-220.pdf (Year: 2020).*

Murphy et al., Towards trust-based data weighting in machine learning, 2023 IEEE 31st International Conference On Network Protocols (ICNP), pp. 1-6 (Oct. 2023) (Year: 2023).

* cited by examiner

THIRD-PARTY PROXIES FOR CRYPTO-BASED DCF

FIELD OF THE INVENTION

Embodiments of the present invention generally relate to data confidence fabrics. More particularly, at least some embodiments of the invention relate to systems, hardware, software, computer-readable media, and methods, for enabling users of services provided by way of a data confidence fabric to employ various different payment mechanisms for those services.

BACKGROUND

Systems that employ smart contracts to automate payments are able to achieve a highly trusted billing environment. The same applies to a data confidence fabric (DCF) where using smart contracts can guarantee the desired outcome for involved parties without any involvement by an intermediary. However, such a decentralized automated system may lead to certain problems.

For example, in the context of a DCF, insufficient funds in a customer wallet will lead to a disruption in write operations to the DCF ledger which may not be desirable in certain scenarios. For example, reconstructing and reprocessing annotations for past instants, as may be necessitated by inadequate available customer funds, could be costly, especially given a high volume of transactions. A trust provider, and the customer, may instead prefer that the trust service provided through the DCF continue running regardless of the payment situation, at least for a certain period of time. Further, to build up and maintain goodwill with customers, a trust provider may prefer to allow flexibility in the payment mechanism where the provided service continues even with insufficient funds, and the customer account accrues a negative balance.

Another concern relating to conventional uses of smart contracts, particularly where cryptocurrencies are involved, is that an entity such as a customer or trust provider, may have organizational limitations or restrictions on using cryptocurrencies. When a DCF uses smart contracts as the only method of entering contracts and exchanging currency, then such entities will be unable to join the DCF and avail themselves of the trust functions provided through the DCF.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
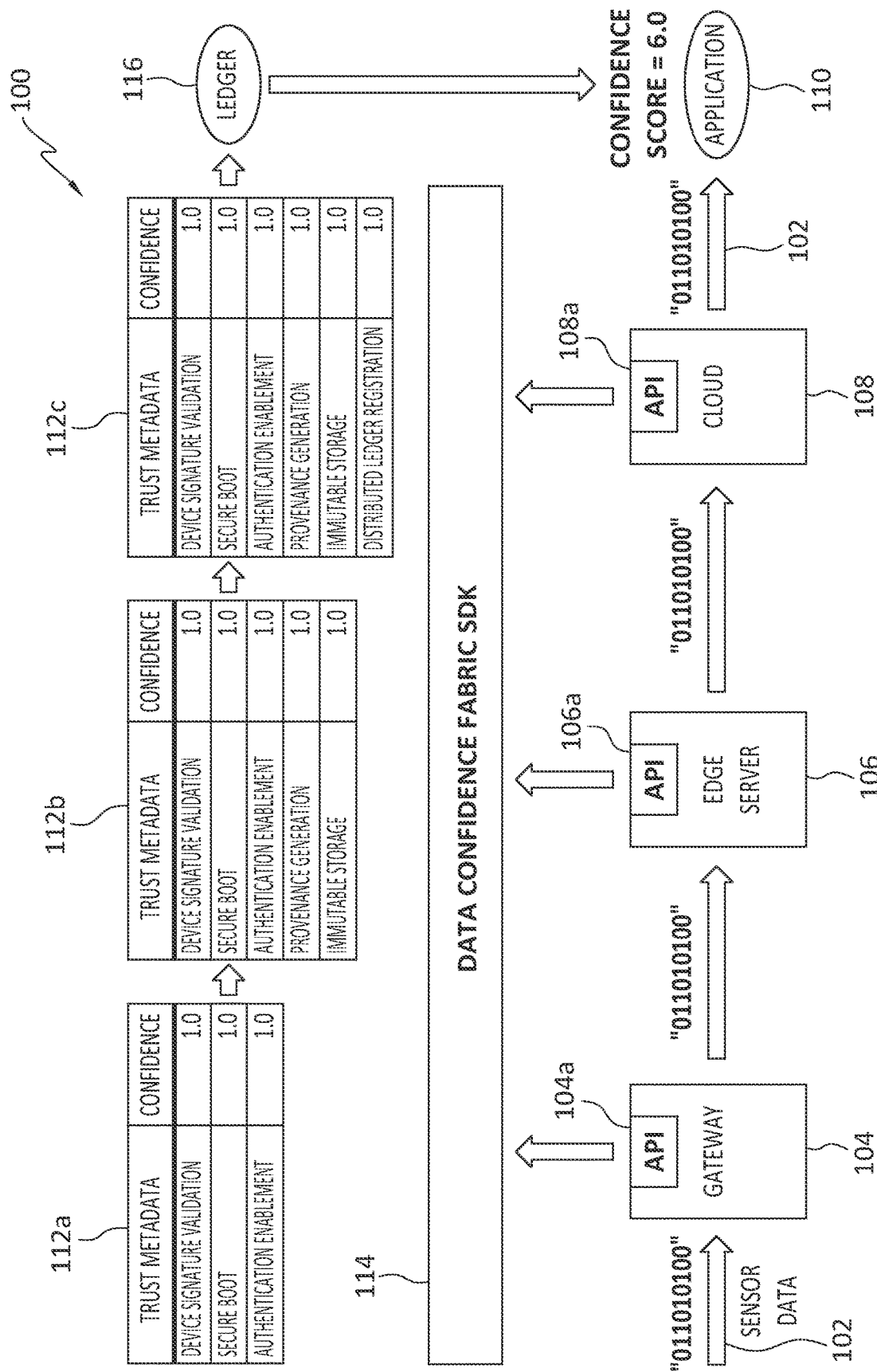
FIG. 1 discloses aspects of a data confidence fabric according to one example embodiment.

Embodiments of the present invention generally relate to data confidence fabrics. More particularly, at least some embodiments of the invention relate to systems, hardware, software, computer-readable media, and methods, for enabling users of services provided by way of a data confidence fabric to employ various different payment mechanisms for those services.

In one example embodiment of the invention, multiple different wallets of one or more entities, such as customers of trust services provided by way of a DCF for example, may be connected to the DCF. One of the wallets of an entity may be configured for use with cryptocurrency, and another wallet of the entity may be a proxy wallet, configured for use with conventional currency, that is managed by a third party proxy with which a trust provider, associated with the DCF, is able to communicate. In the event that the trust provider does not support use of cryptocurrency, the third party may instantiate a smart contract on behalf of the trust provider and, pursuant to the smart contract, may receive payment from the proxy wallet of the customer for the trust services. The third party may then transfer the payment received from the proxy wallet to the trust provider.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect an embodiment of the invention is that trust services provided to a customer may continue, uninterrupted, even when a wallet of the customer lacks sufficient funds to cover the cost of the trust services. As another example, a trust service provider with limitations on the use of cryptocurrency may nonetheless be able to receive payment from a customer by way of a smart contract. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Moreover, an embodiment may comprise, or consist of, operations that are performed only by various types of computing entities, and are not performed by any human(s). That is, unless an embodiment explicitly identifies a human as performing one or more operations of that embodiment, such operations should be understood to be computer-implemented.

A. Aspects of An Example Architecture and Environment

The following is a discussion of aspects of example operating environments for various embodiments of the invention. This discussion is not intended to limit the scope of the invention, or the applicability of the embodiments, in any way. In general, embodiments of the invention may be implemented in connection with systems, software, and components, that individually and/or collectively implement, and/or cause the implementation of, a data confidence fabric (DCF).

With reference now to FIG. 1, embodiments of the invention may be implemented in a variety of operating environments, one example of which is a DCF, denoted at 100 in FIG. 1. In general, the DCF 100 may annotate and score any data that flows within it, providing increased confidence to the applications that use that data, such as for analytical purposes for example.

As shown in FIG. 1, the example DCF 100 concerns the context of edge-based use cases, but the scope of the invention is not limited to such cases or contexts. As shown in the example of FIG. 1, data such as sensor data 102 generated by a sensor flows through one or more tiers, or layers, of the DCF. In the illustrated example, the data 102 may flow through nodes such as a gateway 104, edge server 106, and cloud ecosystem 108, and may ultimately be consumed by one or more applications 110. As trusted handling of the data 102, at the nodes of the various layers, occurs during data 102 delivery, respective trust metadata 112a, 112b, and 112c may be associated with the data 102 by those nodes, that is, by the gateway 104, edge server 106, and/or, cloud ecosystem 108. Thus, trust metadata may continue to accumulate as the data 102 passes through the various nodes in its path.

The trust metadata 112a, 112b, and 112c, may comprise, for example, respective confidence scores associated with trust insertion processes performed by the nodes with respect to the data 102. The trust metadata 112a, 112b, and 112c may be associated with the data 102 by respective node APIs (Application Program Interfaces) 104a, 106a, and 108a that communicate with an interface 114 such as an Alvarium SDK (Software Development Kit). After the data 102 has transited the various nodes, the final, comprehensive trust metadata 112c may be entered into a ledger 116 which may make the trust metadata 112c available for use by the applications 110. Note that, in this example, the trust metadata 112c is an accumulation of all the trust metadata respectively added by the gateway 104, edge server 106, and cloud ecosystem 108.

To illustrate with reference to the specific example of FIG. 1, the gateway 104 may annotate, to the data 102, respective trust metadata 112a for each of three different operations. Particularly, the gateway 104 may annotate trust metadata 112a that indicates, among other things: the gateway 104 has successfully validated the signature coming from the device that generated the data 102; the gateway 104 has used a TPM chip to confirm that the BIOS, firmware, or O/S on the gateway 104 was tampered with during boot; and, the gateway 104 is currently running authentication/authorization software to protect the data 102 stream from unwanted inspection or access. With continued reference to the trust metadata, including the trust metadata 112a, a Confidence score of "1.0" means that a trust insertion process, such as the secure boot confirmation for example, operation succeeded, while a score of "0," for example, might indicate that signature validation failed, or was not performed for some reason.

As noted earlier, the DCF metadata, that is, the trust metadata 112a, ultimately arrives at the ledger 116, where a ledger entry may be created that permanently records the contents of the trust metadata 112a table as well as an overall Confidence Score, which is 6.0 in this illustrative example. Note that the equation used to calculate the Confidence Score in the example of FIG. 1 is simply a summation of confidence scores, but other approaches to calculating an overall Confidence Score may alternatively be employed.

A useful aspect of the example DCF 100 is that, as a result of the annotation of trust metadata 112a, 112b, and 112c, the application 110 may have access to additional context about the trustworthiness of the data 102, addressing the problem of potentially untrustworthy or malicious data sources. The problems presented by such data sources are increasingly faced by enterprise customers as they move their business logic closer to non-enterprise, and potentially untrustworthy, data sources at the edge and/or elsewhere. In the example DCF 100, the path of the data 102 may be largely software-dependent, in the sense that data path handling software, which may comprise a respective instance at each of the gateway 104, edge server 106, and cloud ecosystem 108, may call an annotation/scoring API 104a, 106a, and 108a, respectively, and routing software may be provided at these nodes that forwards the annotations along the data path.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Overview of an Example Embodiment

One example embodiment of the invention may enable various different entities to connect multiple respective wallets with Alvarium, or another DCF interface, under the same entity name/identifier. In this way, a single entity, such as a customer or a service provider for example, may be associated with multiple different wallets from which funds can be drawn, by various parties, for payment relating to services rendered to the entity. Following are some non-limiting examples of connected wallets that may be used by various entities in an embodiment of the invention.

A trust provider, for example, may use a third-party proxy organization wallet. In this way, a trust provider that does not have a cryptocurrency account or wallet may rely on a third party crypto-based proxy organization by signing a traditional-currency-based contract with the proxy organization. The proxy organization may then create a smart contract on behalf of the trust provider. The customer devices may be onboarded to the DCF using this smart contract and based on their pre-agreed terms, the proxy organization may forward payments, for trust services rendered by the trust provider, to the traditional currency wallets of the trust provider.

As another example, a trust provider may additionally, or alternatively, have a cryptocurrency wallet. Thus, trust providers that have their own cryptocurrency accounts may continue using their crypto wallets to receive payments from customers based on the provided services.

Like service providers, customers may, in an embodiment, employ various types of wallets. One such wallet is a third-party proxy organization wallet. Similar to trust providers, customers that do not have cryptocurrency accounts or wallets, but still wish to join a DCF, may obtain crypto-based wallet details from a third-party proxy organization and sign a traditional-currency-based contract with the proxy organization.

As another example, a customer may use a trust provider cryptocurrency wallet. To address the problem of insufficient customer funds mentioned above, a trust provider may enable applications to connect through a fallback wallet that belongs to the trust provider. When the funds in the customer wallet are not sufficient to pay the provider fee, a DCF interface such as Alvarium may switch to the fallback wallet and annotations may continue to be written to the DCF ledger. Note that, in an embodiment, simply setting a service provider fee to zero may not be enough to avoid service disruption with low funds. This is because the underlying ledger technology, such as blockchain or *Hedera* network, may require a gas fee to call smart contract functions. Hence without the proposed fallback wallet, accounts with insufficient funds may be unable to continue writing data annotations to the DCF ledger. Note that as used herein, a 'gas fee' embraces, but is not limited to, fees incurred in using the DCF. Such fees may be assessed, for example, on the number of transactions engaged in by a customer, which may be expressed as a number of API (application program interface) calls for example.

As a final example, a customer may use its own cryptocurrency wallet. Thus, customers that own cryptocurrency accounts can continue using their cryptocurrency wallets to make payments to trust providers through smart contracts. These customer cryptocurrency wallets may also be configured along with additional third-party proxy or trust provider fallback wallets to ensure continuous service to the customer without disruptions. This fallback feature may be enabled by concurrently configuring multiple customer wallets. A customer may set the connected wallets in order of priority with the fallback wallet, for example, at the lowest priority. The transparency of information provided by decentralized DLTs will enable trust providers to easily access, calculate and share information on negative balances with customers.

As noted herein, an embodiment of the invention may employ one or more smart contracts. In general, a smart contract may comprise a program that is stored on a blockchain and runs, possibly automatically, when one or more predetermined conditions, which may be written in code on the blockchain, are met. A smart contract may be used, for example, to automate the execution of an agreement so that all participants can be immediately certain of the outcome, without any delay, or involvement by an intermediary. A smart contract may automate performance of a workflow, triggering a next action when one or more specified conditions are met. The action(s) may be executed by one or more computers when the specified conditions are met. Thus, and with reference to an embodiment of the invention, one such action may include releasing funds to a party or entity.

Finally, and in view of the various example wallets that may be employed in an embodiment of the invention, one embodiment is discussed below in connection with FIG. 2. The non-limiting example of FIG. 2 assumes that for the application, all three wallet types are configured. For the trust provider, the example of FIG. 2 assumes that a third-party proxy organization is used for a cryptocurrency account and wallet.

C. Detailed Description

Figure 2:
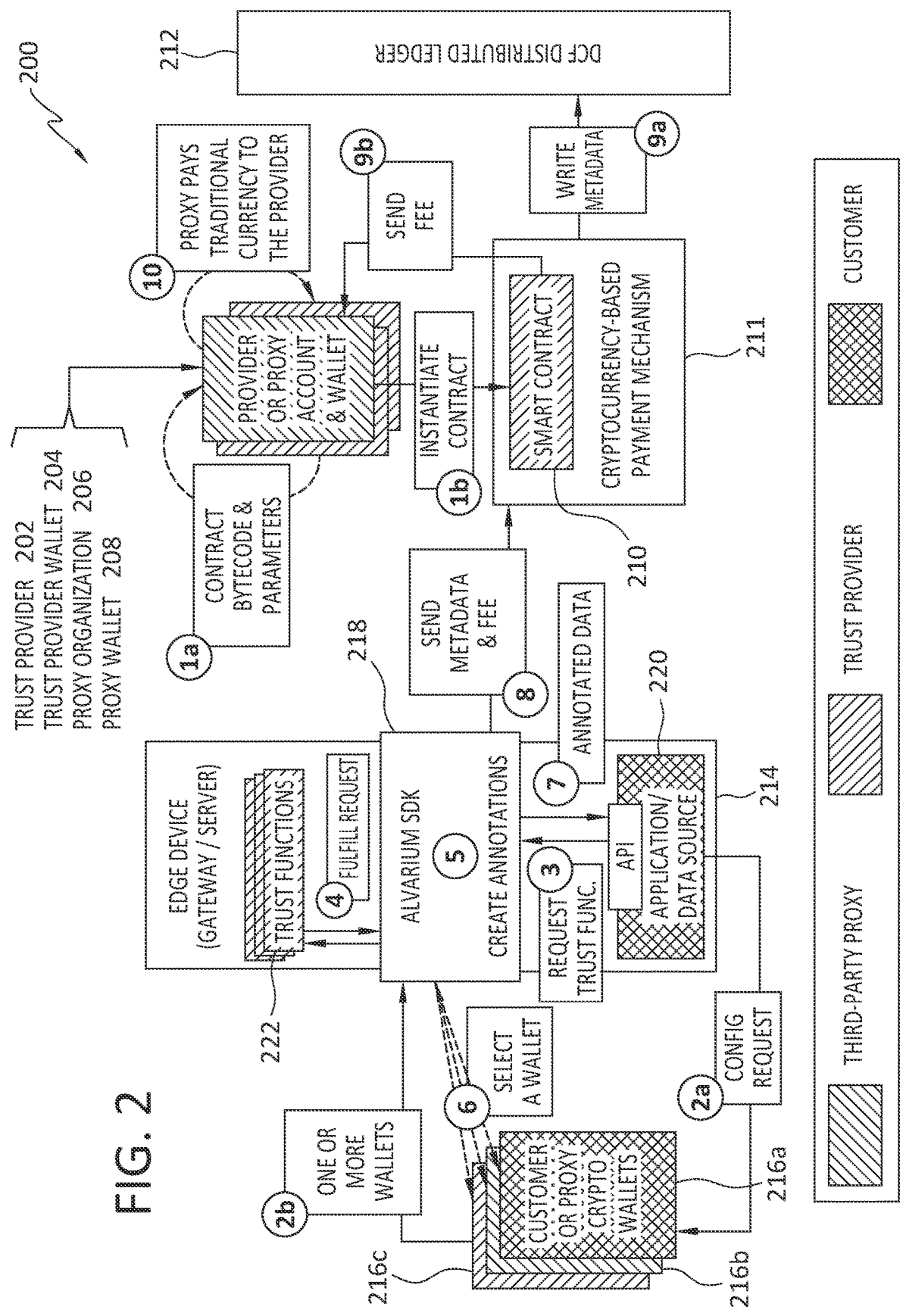
FIG. 2 discloses aspects of an architecture and related methods and operations according to one example embodiment.

With attention now to FIG. 2, which discloses aspects of a method for enabling multiple wallet configuration for entities in cryptocurrency payment mechanism, an architecture according to one example embodiment is denoted generally at 200. The numbering scheme in FIG. 2 will be used in the following discussion. Note also that elements respectively denoted, in FIG. 2, as 'trust provider,' 'third party' and 'customer,' are elements associated with those respective entities, but are not necessarily the entity(ies) themselves.

Service providers, such as trust providers, or providers of trust services, that do not own the cryptocurrency used by the underlying DCF, may deploy a smart contract using a third-party proxy organization. In an embodiment, a trust provider 202, which is associated with a trust provider wallet 204, may prepare [1a] a smart contract, such as in Solidity for example, and compile the smart contract to generate a bytecode, and send the bytecode to a third party proxy organization, or simply 'proxy organization,' 206 which may be associated with a proxy wallet 208. As well, other initialization parameters may be shared by the trust provider 202 with the proxy organization 202 such as, for example, fee per annotation for a particular trust function. In an embodiment, this sharing may take place outside of the decentralized DLT domain and may be protected using traditional contracts between the proxy organization 202 and the trust provider organization 201. The sharing may also involve other agreements between the parties, such as an agreement that specifies a commission or fee for the services provided by the proxy organization 202.

Next, the proxy organization 206 may instantiate [1b] a smart contract 210 on behalf of the trust provider 202. The smart contract 210 may be configured to operate in connection with a cryptocurrency-based payment mechanism 211. The instantiation [1b] may be implemented, for example, by submitting the bytecode to a DCF distributed ledger 212 along with parameters required by the constructor function, including wallet details of the owner, which is a proxy wallet 208 in this example, fee per annotation, and payment scheme such as per-annotation or bulk, for example.

With the smart contract 210 and proxy wallet 208 in place, a customer 214 that wishes to onboard its applications and data sources to the DCF may connect one or more cryptocurrency wallets 216a and 216b to the Alvarium SDK or other DCF interface. In an embodiment, connecting a wallet 208 may involve the submission [2a] of a configuration request that comprise two inputs, namely, an identifier, and credentials for connecting.

The multiple wallet feature, which may be provided by an interface such as Alvarium 218, may be configured to provide both these inputs separately. A third-party may connect their wallet to Alvarium 218 using secure connection mechanisms or other available services. One embodiment of the invention is agnostic to the mechanism used for securely connecting a wallet, allowing the DCF provider to choose one or multiple secure mechanisms for connecting wallets to Alvarium. When an account or wallet ID is provided by customer, such as in connection with the configuration request [2a], Alvarium 218 may validate the wallet configuration and proceed as set forth below if the wallet is connected, and the funds are accessible. As noted in the discussion below, the wallets 216 may define a hierarchy in terms of their relative priority for providing funds.

The example of FIG. 2 assumes that the customer 214 has a cryptocurrency wallet 216a of their own which may set, by the customer 214, as having the highest priority as among a group of customer wallets. In this example, a proxy wallet 216b may also configured and set as the second option. Finally, a fallback wallet 216c option provided by the trust provider may also be enabled. Note that the trust provider wallet 216c may also be connected using the abovementioned approach, ensuring that the account cannot be accessed by a customer 214 for any activities other than paying the DCF-related fees. The various wallets may then be connected [2b] to Alvarium 218.

An application 220 or other data source of the customer 214 may then request [3] certain trust functions 222, such as generation of trust metadata for example, to be applied to their data through Alvarium 218. The request [3] may be fulfilled [4] and the data that was processed using the specified trust functions 222 sent to Alvarium 218 which may then create [5] annotations for the data based on the trust functions 222 that were applied at [4].

Alvarium 218 may then select [6] one of the connected wallets 216 that may be used to call the corresponding smart contract 210 function. In an embodiment, the selection [6] may comprise identifying the highest priority wallet 216 with sufficient funds to pay the fee. For example, if the application owner wallet 216a has sufficient funds, it may be selected to call the smart contract 210. If not, then Alvarium 218 may query [6] any proxy wallets 216b that have been configured and connected. Finally, a fallback wallet 216c may be checked [6] by Alvarium 218. In an embodiment, the network gas fee may not be known in advance and may vary for each call. For resiliency, Alvarium 218 may repeat [6] if the actual call to the smart contract 210 fails, as discussed in more detail below. The call to the smart contract 210 may be repeated until it is successful, or until all wallets 216 have been traversed.

When the smart contract 210 call has succeeded, indicating that one of the wallets 216 has sufficient funds to cover the trust provider fee, the annotated data may be sent back [7] to the application 220. Next, Alvarium 218 may call the smart contract 210 based on the underlying mechanism used for writing annotations and paying the fee, and Alvarium 218 may send [8] trust metadata and the trust provider fee to the smart contract 210. In an embodiment, this approach does not require changes to the payment mechanism 211 used by the DCF and, in fact, may work in conjunction with the DCF payment mechanism 211. If the smart contract 210 function calls fail to execute, then [6] may be repeated with other wallets 216, as explained above.

When the function call from Alvarium 218 to the smart contract 210 succeeds, the trust metadata may be written [9a] on the DCF distributed ledger 212. The fee due to the trust provider 202 may then be transferred [9b] to the trust provider wallet, which in this example may be the proxy wallet 208 and may require additional actions to be taken, such as transfer of conventional payment from the proxy organization 206 to the trust provider wallet 204, as discussed below. Any remainder in excess of the amount due may be sent back to Alvarium 218 and then deposited back to the wallet 216 that was used to call the smart contract 210.

At some point, based on their agreed upon terms, the proxy organization 206 may deduct any predefined commission fee and transfer the trust provider earnings to the trust provider using traditional currency exchange mechanisms. Rights or protections and service level agreements for this stage may not be able to be guaranteed using the decentralized, autonomous DLT (distributed ledger technology) as this stage may take place outside of the DLT domain. However, as each transaction is recorded in the distributed ledger 212, along with fees and other metadata, auditing and claim settlements may benefit from an embodiment of the invention.

D. Further Discussion

As disclosed herein, one example embodiment comprises an approach that resolves two concerns in data confidence fabrics that use payment schemes based on smart contracts, namely, the problem of insufficient customer funds at execution time, and the problem of participation in a payment scheme by non-cryptocurrency-based entities. In an embodiment, this approach may include the connection of multiple wallets, per entity, to Alvarium or other DCF interface. This approach may enable entities that cannot deal in cryptocurrency to avail themselves of services from third party proxy organizations. Furthermore, this approach may enable organizations with high stakes in continuous DCF operation to provide fallback wallets and funds, thus resolving the problem of insufficient customer funds, while also ensuring that needed DCF services continue to be provided to the customer. An embodiment comprises a mechanism that enables entities, such as a trust provider for example, to connect their wallets in a secure way, which enables them to better manage their accounts while also providing wallet services to trust service customers.

An embodiment of the invention may build on the notion of cryptocurrency-based payment mechanisms such as are disclosed in Appendix A hereto. Such payment mechanisms may use smart contracts instead of traditional contracts and are hence more efficient, faster, require fewer human resources, are automated and cheaper to instantiate. While these traits are desirable, they can sometimes lead to certain real-world limitations such as the ones addressed in the proposed solution. Thus, an embodiment of the invention may introduce an element of traditional contracts and currency that works in conjunction with the cryptocurrency payment mechanism used by a DCF and may enable non-crypto-based entities to join the DCF, hence enabling a wider adoption of the DCF technology by extending its availability to a wider array of participants.

E. Example Use Case

One example embodiment serves to resolve certain issues in DCF systems that exclusively employ smart contracts for payments and billing. While such systems achieve a highly trusted billing environment, they may cause problems for entities that have limited, or no, access to cryptocurrency for payment. For example, assume a scenario where XYZ Corp. may not own or deal in cryptocurrency due to legal, strategic, or business reasons, but still wants to provide trust services and products to customers that are a part of a data confidence fabric. In such a use-case, an embodiment of the invention enables XYZ Corp. to employ a third-party proxy organization that can instantiate a smart contract on behalf of XYZ Corp. and receive payments from the users of trust services provided by XYZ Corp. A traditional contract between XYZ Corp. and the third-party proxy organization will enable XYZ Corp. to receive its earnings in traditional currency while serving cryptocurrency-based customers.

F. Example Methods

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

G. Further Example Embodiments

Following are some further example embodiments of the invention. These are presented only by way of example and are not intended to limit the scope of the invention in any way.

Embodiment 1. A method, comprising: receiving, by a trust provider from a third party proxy, an indication that the third party proxy has instantiated a smart contract on behalf of the trust provider; connecting wallets of a customer to an agent of a data confidence fabric, wherein the wallets comprise a cryptocurrency wallet and a conventional currency wallet; in response to a request from an application, providing a trust service that comprises processing customer data by applying a trust function to the customer data; creating annotations for the customer data, based on the trust function that was applied; providing the processed customer data to a recipient; calling the smart contract using successive ones of the customer wallets until the smart contract is successfully executed; transferring, from the customer wallet that resulted in successful execution of the smart contract to the third party proxy, a trust provider fee assessed for performance of the trust function; and transferring the trust provider fee from a third party proxy wallet to a trust provider wallet.

Embodiment 2. The method as recited in any preceding embodiment, wherein the smart contract is called by the customer wallets according to a hierarchy of the customer wallets.

Embodiment 3. The method as recited in any preceding embodiment, wherein the customer wallet that results in successful execution of the smart contract is whichever customer wallet is first identified as having adequate funds to cover the trust provider fee.

Embodiment 4. The method as recited in any preceding embodiment, wherein the trust provider is unable to perform cryptocurrency transactions with the customer.

Embodiment 5. The method as recited in any preceding embodiment, wherein one of the customer wallets does not have sufficient funds to cover the trust provider fee.

Embodiment 6. The method as recited in any preceding embodiment, wherein the trust service continues to be applied notwithstanding that one or more of the customer wallets do not have sufficient funds to cover the trust provider fee.

Embodiment 7. The method as recited in any preceding embodiment, wherein the processed data and annotations are provided to a recipient after the trust provider fee has been transferred to the proxy wallet.

Embodiment 8. The method as recited in any preceding embodiment, wherein the trust provider fee transferred from the third party proxy wallet to the trust provider wallet is in a form other than cryptocurrency.

Embodiment 9. The method as recited in any preceding embodiment, wherein the customer wallets are only connected after receipt, from the customer, of a customer identifier, and connection credentials.

Embodiment 10. The method as recited in any preceding embodiment, wherein the customer is unable to perform cryptocurrency transactions with the trust provider.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
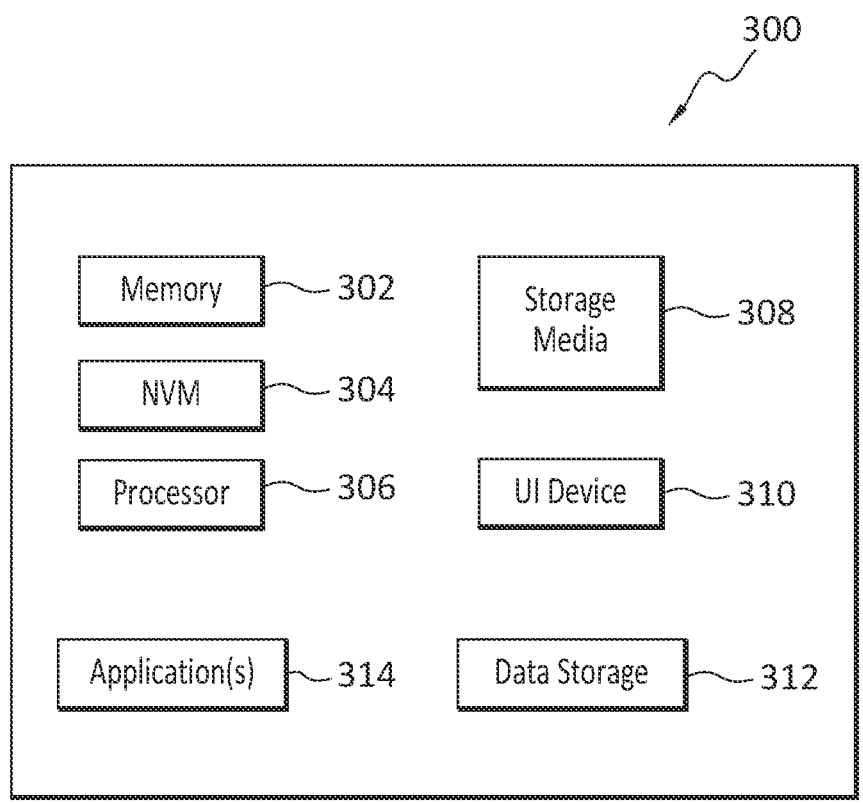
FIG. 3 discloses an example computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving, by a trust provider from a third party proxy, an indication that the third party proxy has instantiated a smart contract on behalf of the trust provider;
connecting wallets of a customer to an agent of a data confidence fabric, wherein the wallets comprise a cryptocurrency wallet and a conventional currency wallet;
in response to a request from an application, providing a trust service that comprises processing customer data by applying a trust function to the customer data;
creating annotations for the customer data, based on the trust function that was applied;
providing the processed customer data to a recipient;
calling the smart contract using successive ones of the customer wallets until the smart contract is successfully executed;
transferring, from the customer wallet that resulted in successful execution of the smart contract to the third party proxy, a trust provider fee assessed for performance of the trust function; and
transferring the trust provider fee from a third party proxy wallet to a trust provider wallet.

2. The method as recited in claim 1, wherein the smart contract is called by the customer wallets according to a hierarchy of the customer wallets.

3. The method as recited in claim 1, wherein the customer wallet that results in successful execution of the smart contract is whichever customer wallet is first identified as having adequate funds to cover the trust provider fee.

4. The method as recited in claim 1, wherein the trust provider is unable to perform cryptocurrency transactions with the customer.

5. The method as recited in claim 1, wherein one of the customer wallets does not have sufficient funds to cover the trust provider fee.

6. The method as recited in claim 1, wherein the trust service continues to be applied notwithstanding that one or more of the customer wallets do not have sufficient funds to cover the trust provider fee.

7. The method as recited in claim 1, wherein the processed data and annotations are provided to a recipient after the trust provider fee has been transferred to the proxy wallet.

8. The method as recited in claim 1, wherein the trust provider fee transferred from the third party proxy wallet to the trust provider wallet is in a form other than cryptocurrency.

9. The method as recited in claim 1, wherein the customer wallets are only connected after receipt, from the customer, of a customer identifier, and connection credentials.

10. The method as recited in claim 1, wherein the customer is unable to perform cryptocurrency transactions with the trust provider.

11. A non-transitory storage medium having stored therein instructions that are executable by one or more hardware processors to perform operations comprising:
  receiving, by a trust provider from a third party proxy, an indication that the third party proxy has instantiated a smart contract on behalf of the trust provider;
  connecting wallets of a customer to an agent of a data confidence fabric, wherein the wallets comprise a cryptocurrency wallet and a conventional currency wallet;
  in response to a request from an application, providing a trust service that comprises processing customer data by applying a trust function to the customer data;
  creating annotations for the customer data, based on the trust function that was applied;
  providing the processed customer data to a recipient;
  calling the smart contract using successive ones of the customer wallets until the smart contract is successfully executed;
  transferring, from the customer wallet that resulted in successful execution of the smart contract to the third party proxy, a trust provider fee assessed for performance of the trust function; and
  transferring the trust provider fee from a third party proxy wallet to a trust provider wallet.

12. The non-transitory storage medium as recited in claim 11, wherein the smart contract is called by the customer wallets according to a hierarchy of the customer wallets.

13. The non-transitory storage medium as recited in claim 11, wherein the customer wallet that results in successful execution of the smart contract is whichever customer wallet is first identified as having adequate funds to cover the trust provider fee.

14. The non-transitory storage medium as recited in claim 11, wherein the trust provider is unable to perform cryptocurrency transactions with the customer.

15. The non-transitory storage medium as recited in claim 11, wherein one of the customer wallets does not have sufficient funds to cover the trust provider fee.

16. The non-transitory storage medium as recited in claim 11, wherein the trust service continues to be applied notwithstanding that one or more of the customer wallets do not have sufficient funds to cover the trust provider fee.

17. The non-transitory storage medium as recited in claim 11, wherein the processed data and annotations are provided to a recipient after the trust provider fee has been transferred to the proxy wallet.

18. The non-transitory storage medium as recited in claim 11, wherein the trust provider fee transferred from the third party proxy wallet to the trust provider wallet is in a form other than cryptocurrency.

19. The non-transitory storage medium as recited in claim 11, wherein the customer wallets are only connected after receipt, from the customer, of a customer identifier, and connection credentials.

20. The non-transitory storage medium as recited in claim 11, wherein the customer is unable to perform cryptocurrency transactions with the trust provider.

* * * * *